US011914590B1

(12) United States Patent
Plenderleith

(10) Patent No.: US 11,914,590 B1
(45) Date of Patent: Feb. 27, 2024

(54) DATABASE REQUEST ROUTER IMPROVING SERVER CACHE UTILIZATION

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 16/176,642

(22) Filed: Oct. 31, 2018

(51) Int. Cl.
*G06F 16/2453* (2019.01)
*G06F 16/27* (2019.01)
*G06F 16/2455* (2019.01)

(52) U.S. Cl.
CPC .. *G06F 16/24539* (2019.01); *G06F 16/24542* (2019.01); *G06F 16/24552* (2019.01); *G06F 16/27* (2019.01)

(58) Field of Classification Search
CPC ............... G06F 16/24539; G06F 16/27; G06F 16/24542; G06F 16/24552; G06F 16/17
USPC ........................................................ 707/717
See application file for complete search history.

(56) References Cited

U.S. PATENT DOCUMENTS

| | | | | |
|---|---|---|---|---|
| 6,480,836 | B1* | 11/2002 | Colby | G06F 16/24539 707/999.102 |
| 8,543,554 | B1* | 9/2013 | Singh | G06F 16/24552 707/706 |
| 8,856,022 | B1* | 10/2014 | Bialostocki | G06F 16/24539 705/7.35 |
| 9,032,017 | B1* | 5/2015 | Singh | G06F 16/25 709/219 |
| 9,305,056 | B1* | 4/2016 | Gupta | G06F 16/24552 |
| 9,667,569 | B1* | 5/2017 | McHugh | H04L 47/11 |
| 9,842,031 | B1* | 12/2017 | Kharatishvili | G06F 11/1474 |
| 9,880,933 | B1* | 1/2018 | Gupta | G06F 12/0815 |
| 10,061,852 | B1* | 8/2018 | Plenderleith | H04L 67/568 |
| 2002/0198883 | A1* | 12/2002 | Nishizawa | G06F 16/9574 |
| 2004/0236726 | A1* | 11/2004 | Ewing | G06F 16/24552 |
| 2005/0089034 | A1* | 4/2005 | Sakata | H04L 45/50 370/389 |
| 2013/0080388 | A1* | 3/2013 | Dwyer | G06F 16/24552 707/634 |

(Continued)

*Primary Examiner* — William Spieler
(74) *Attorney, Agent, or Firm* — Robert C. Kowert; Kowert, Hood, Munyon, Rankin & Goetzel, P.C.

(57) ABSTRACT

Systems and methods are provided to implement a database request router that routes queries to database servers storing database replicas. In embodiments, the request router maintains caching state metadata that indicates respective caching states of the database servers. For an incoming query, the request router selects a database server to receive the query based on the caching states of the database servers to improve cache utilization. In embodiments, the caching state metadata indicates whether different database objects used by observed queries are cached at individual servers. The database objects used may be determined from execution plans for the queries, obtained from the database servers. In embodiments, the request router may determine a querying pattern of the database and use it to predict an expected time for certain queries. The request router may generate a priming query ahead of the expected time to prepare database server cache for the expected queries.

20 Claims, 12 Drawing Sheets

(56) References Cited

U.S. PATENT DOCUMENTS

| | | | |
|---|---|---|---|
| 2016/0147833 A1* | 5/2016 | Chaudhry | G06F 16/24552 |
| | | | 707/717 |
| 2016/0277515 A1* | 9/2016 | Kasten | H04L 67/52 |
| 2016/0335163 A1* | 11/2016 | Teodorescu | G06F 3/04847 |
| 2016/0335317 A1* | 11/2016 | Teodorescu | G06F 15/17331 |
| 2017/0017692 A1* | 1/2017 | Das | G06F 16/2453 |
| 2017/0293626 A1* | 10/2017 | Dageville | H04L 67/06 |

* cited by examiner

DATABASE REQUEST ROUTER IMPROVING SERVER CACHE UTILIZATION

BACKGROUND

Databases are ubiquitous systems designed to provide storage and access to data for large numbers of database clients. The database clients, in turn, may provide many different services and functionalities in different applications. A database client may connect to the database server and issue queries on the data via the connection. In some database implementations, when a query is executed, certain data may be cached by the database's query engine, resulting in quicker response times on subsequent queries of similar type. For example, a query seen for the first time by a database might take two minutes to execute, but the same query received by a database in a cached state could be served using data stored in the database server's cache much more quickly, in some cases in seconds. However, in database implementations that have a large number of replicated database servers, the queries may be distributed to different servers depending on the routing policy. This distribution reduces the rate of cache hits for queries, increases the overall latency of queries, and generally results in inefficient use of the query caches on the servers.

Figure 1A:
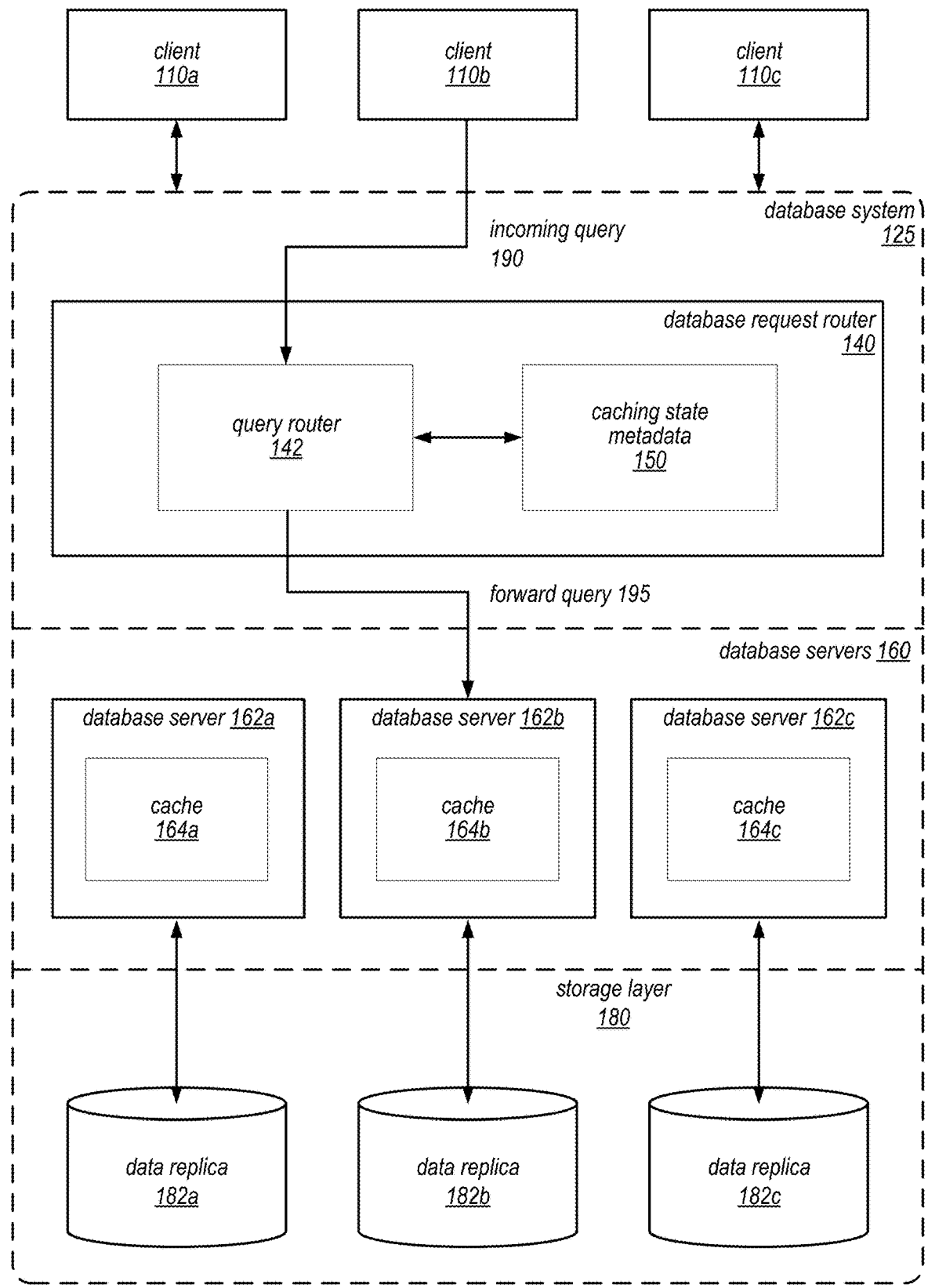
FIGS. 1A and 1B are block diagrams illustrating examples of a database request router that routes queries to multiple replica servers to improve cache utilization across the servers, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a database request router that routes queries to different replica servers of a database to improve cache utilization on the servers. In some embodiments, the request router maintains caching state metadata that indicates respective caching states of the database servers. Depending on the caching implementation of the underlying database servers, the caching state metadata may indicate, for different types of observed queries, which database server is currently caching data objects used by the query type or query results of the query type. In some embodiments, the request router may obtain and store in the caching state metadata database objects used by different types of queries (e.g., tables and indexes). In some embodiments, these objects may be determined by obtaining the query execution plan of the query from the database servers. In some embodiments, the request router may determine a querying pattern of the database and use it to predict an expected time for certain queries. The request router may generate a priming query ahead of the expected time to prepare the cache of a selected database server for the expected queries.

As one skilled in the art will appreciate in light of this disclosure, embodiments of the request router disclosed herein are capable of achieving certain technical advantages over prior art request router systems. For example, in prior art systems, the request router may distribute incoming queries to a large number of different servers, which each have their own caching states. This distribution means that similar queries that can take advantage of the caching state of one server are sometimes routed to other servers that do not have that caching state. Thus, the distribution reduces the rate of cache hits for queries, increases the overall latency of queries, and generally results in inefficient use of the query caches on the servers. This problem is aggravated as the number of database servers increase, so that in the extreme case, the benefits of caching are largely lost.

Accordingly, to address these problems, in some embodiments, the request router would maintain some caching state information or metadata about the database servers, and route queries to the servers with the servers' caching states as a factor. For example, in some embodiments, the request router may employ server caching state to reduce a number of candidate servers for a particular received query, and then select one from the group of candidate servers based on other factors, such as server load condition, etc. In some embodiments, the request router may compare an incoming query to other likely similar queries that it has encountered before, and route the query to an available database server that executed something similar recently, thus leveraging database server's current caching state. In some embodiments, the request router may include intelligence to perform sophisticated management of the servers' caching states, to build up server groups that "specialize" in certain types of queries or certain groups of database objects, further improving the overall performance of queries.

By using the request router to manage server cache states, the database's overall caching performance can be dramatically improved. This managed approach can be used to increase the overall cache hit rate across all of the database servers. Because the server caches are better utilized, queries are served much faster on the average. Better cache performance also results in improved resource utilization, for example, less storage volume traffic, less network traffic, and less CPU usage to process repetitive queries.

In some embodiments, the caching state metadata maintain by the request router may include not just database objects specified in the query, but also database objects (such as indexes) that are used by the database engine to execute the query. In some database implementations, these database objects may be obtained via a request to the database server to obtain an execution plan for a query (e.g., the SQL "explain" command implemented in certain databases). In this manner, the request router may gain an understanding as to which query types use common indexes, which may be cached in the memory of particular serves, and direct queries using the same indexes to the same group of servers to take advantage of these objects.

In some embodiments, the request router may perceive, based on its caching state metadata, that certain queries contain query predicates whose results are not cached in any of the database servers. However, the request router may determine that the query predicates of the query are very close to a previous set of query predicates that was evaluated by a particular database server. For example, the query predicates of the incoming query may specify one extra condition on an additional column over a previous query. In some embodiments, in this situation, the request router may generate a message to the client that issued the new query, indicating or recommending a revision to the query so that it can take advantage of the caching state of the database server. For example, the request router may issue a warning message that the current query may execute much faster if the additional column condition is removed.

In some embodiments, the request router may perform a priming of the cache of particular database servers, in anticipation of expected queries that will be received in the new future. In some embodiments, the request router, or some other component, may monitor query traffic to the database over time, and infer a querying pattern of the database. For example, a querying pattern may indicate that a particular type of query may be received at a regular time every day. In some embodiments, when an observed pattern is sufficiently reliable, the request router may generate a priming query ahead of expected queries in the future, as may be predicted from the pattern, to prepare the database servers' caches for the expected queries. In some embodiments, the priming query may be a replay of a previously seen query indicated in a historical log of query traffic. In some embodiments, the priming may be performed during a time when the database is not experiencing a high workload (e.g., at night of during a period of low activity precited by the querying pattern data). This priming of database servers further improves querying performance of the database system. These and other features and benefits of the inventive system and method are described in further detail below, in connections with the figures.

FIG. 1A is a block diagram illustrating an example database request router that routes queries to multiple replica servers to improve cache utilization across the servers, according to some embodiments.

As shown, a database system 125 may be implemented using a database request router 140, a number of database servers 160 that act as replica servers 162*a-c,* and a number of storage devices or volumes 182*a-c* that store data replicas of the database. As shown, the database 125 may interact with multiple clients 110*a-c.* The database system 125 may encompass any type of data store or database configurable to receive database statements from the clients. In some embodiments, a given client 110 may include a suitable version of a web browser or a plug-in module for a web browser, or other type of code module configured to execute as an extension to or within an execution environment to provide database or data storage service clients (e.g., client applications, users, and/or subscribers) access to the services provided by database system. In some embodiments, a client 110 may encompass an application such as a database application, media application, office application or any other application that may make use of persistent storage resources. In some embodiments, an application may include sufficient protocol support to establish a database connection with the service provider network 130, which may be used to send multiple database statements to the database.

In some embodiments, the database servers 160 may implement functionality to provide functionality for creating, accessing, and/or managing tables and/or indexes maintained in database instances within a single-tenant environment than those that provide functionality for creating, accessing, and/or managing tables and/or indexes maintained in database instances within a multi-tenant environment. In various embodiments, the components in the database servers 160 may be implemented directly within computer hardware, as instructions directly or indirectly executable by computer hardware (e.g., a microprocessor or computer system), or using a combination of these techniques. For example, the components of the database servers 160 may be implemented by a distributed system including a number of computing nodes (or simply, nodes), such as computing systems described below. In some embodiments, the functionality of a given database system component may be implemented by a particular computing node or may be distributed across several computing nodes. In some embodiments, a given computing node may implement the functionality of more than one database system component.

As shown, the database may include a number of servers 162*a-c,* which may maintain replicas of at least some of the data stored in the database. As shown, each database server 162 may maintain a respective replica 182 of the database's data. In some embodiments, multiple replicas 182 may be maintained for reasons such as increased availability, increased processing power, ease of access, among other considerations. As shown, in some embodiments, the data replicas 182 may be stored as part of a storage layer 180 implemented in the database system 125. In some embodiments, the storage layer 180 may represent a persistent storage layer that persistently stores the contents of the database 125. In some embodiments, the individual replicas 182 may be stored on separate physical storage systems, such as disks or network-attached storage devices. In some embodiments, the storage layer 180 may implement a storage area network (SAN). In some embodiments, the replicas 182 may be stored on separate logical volumes, or as separate files. In some embodiments, the replicas 182 may be stored as distinct storage nodes of a distributed system. In some embodiments, the storage nodes may be implemented as virtual storage nodes hosted on physical storage hardware.

In some embodiments, some replica servers 162 that are allowed to update the data, and some other replica servers 162 whose data is kept read-only. In some embodiments, these replica servers may communicate with each other to keep their respective replicas of the data up to date. Thus, for example, when data is updated via a writable replica server, that update may be propagated to the read replica servers, so that their replicas also reflect the update. In some embodiments, the number of servers 162 in the database may be programmatically managed based on for example the volume of statements received for the replicated data or the amount of data that is stored. In some embodiments, the servers 162 may be physical servers. In some embodiments, the servers 162 may be virtual machine instances that are hosted on one or more virtualization hosts. In some embodiments, each server 162 may comprise a single running instance of the database, which may correspond to a set of listener processes running on a host. Thus, in some embodiments, the servers 162 may use different computing resources (e.g., different physical or virtual compute nodes) to read or write replicated copies of data.

In various embodiments, the database servers 160 may support different types of database statements. For example, in some embodiments, servers 160 may provide a structured query language (SQL) interface, which allow the servers 162 to receive SQL queries and other SQL data manipulation language (DML) or data description language (DDL) statements. In some embodiments, the database servers 160 may also specify how connections are established with the servers 162. In some embodiments, the database servers 160 may implement an application programming interface (API) such as a web services interface that supports a variety of operations on tables or indexes, or other data objects, that are maintained and managed on behalf of clients/users by the data storage service system. The APIs may be provided by the database 130 may support request and response parameters encoded in one or more industry-standard or proprietary data exchange formats, in different embodiments. For example, in various embodiments, queries and responses may adhere to a human-readable (e.g., text-based) data interchange standard, (e.g., JavaScript Object Notation, or JSON), or may be represented using a binary encoding (which, in some embodiments, may be more compact than a text-based representation). In various embodiments, the system may supply default values (e.g., system-wide, user-specific, or account-specific default values) for one or more of the input parameters of the APIs.

As shown, in some embodiments, the servers 162 may each implement a cache 164. The cache 164 may be used by the server to cache data that are used to speed up query executions. For example, in some embodiments, the cache may store in memory one or more database objects that are used by a query, for example, a table (or a portion of a table) read by a recent query, an index (or a portion of an index) read by a recent query, and so on. In some embodiments, the actual results fetched for a query may be cached in the server cache 164. In some embodiments, the cache may be maintained by the database system itself In some embodiments, the cache may be maintained by the operating system of the server itself, or by underlying layers of the software or hardware stack of the system. In some embodiments, the contents of the cache 164 may itself be queried by a client of the database server via one or more querying interfaces.

As shown, database may implement a database request router 140, which is tasked with receiving database statements from clients 110, and then forwarding or routing the statements to individual ones of the databases servers 162. For example, as shown, an incoming query 190 issued by a client may be forwarded 195 to a database server 162*b*, according to the router's routing policy and the conditions of the servers 162. In some embodiments, the database request router 140 may act as a proxy to the servers 162, so that it directly interacts with the clients 110 for the servers 162. In some embodiments, the request router 140 may only route the incoming query, and results of the query are provided to the client without going through the request router 140. In some embodiments, the database request router 140 may expose a data access interface to the clients 110 that mimics the data access interfaces of the servers 162. Thus, in some embodiments, the clients 110 may be oblivious as to whether they are interacting with an actual database server 162 or a database request router 140.

In some embodiments, the database 125 may include multiple database request routers 140. For example, in some embodiments, multiple database request routers 140 may communicate with each other to load balance among themselves. In some embodiments, the request routers 140 may share certain information among themselves, to keep the information synchronized among the group. Such information may include, for example, the members of the group of request routers, the members of the group of database servers 162, the health status or load condition of the servers 162, and in some embodiments, the caching state metadata for the servers 162.

In some embodiments, the request routers 140 may be implemented as virtual machine instances hosted on virtualization hosts. In some embodiments, more request routers 140 instances may be provisioned or launched, depending on the request volume experienced by the database. Thus, the database may be programmed to dynamically scale the size of the request routers fleet, based on the client request volume.

As shown, the database request routers 140 may include a query router 142, which is responsible for forwarding received queries to selected database servers 162. As shown, in some embodiments, the query router 142 may read and write a caching state metadata 150 maintained by or accessible to the database request router 140. In some embodiments, the caching state metadata 150 may indicate respective caching states of the individual servers 162. In some embodiments, the caching state metadata 150 may indicate, for individual query types, which servers 162 are caching data that will be used by the query type. In some embodiments, when a subset of the database servers 160 are caching data that are used by the query type, the query will only be routed to one of the servers in the subset. In some embodiments, the caching state of the server is only one factor in selecting the database server. Other factors may include, for example, the health of the server, the current load condition of the server, various system constraints on the server, among other things indicated in the routing policy of the request router 140. In some embodiments, the caching state metadata 150 may be implemented in one or more tables, which may be kept in the volatile memory of the request router 140. In some embodiments, the caching state metadata 150 may include a server lookup table that maps individual query types to one or more servers that have ready caching states for that query type. Thus, when a query is received, the request router 140 may perform a quick lookup via the caching state metadata 150 to determine which servers the query should be routed to, based on the caching state of the servers indicated by the metadata. Advantageously, by using the caching states of the servers 162 to route queries, the database request router allows the queries to be handled by servers with current caching states that are best suited to handle each individual query. This intelligent routing approach substantially improves the overall cache performance of the database system 125.

Figure 1B:
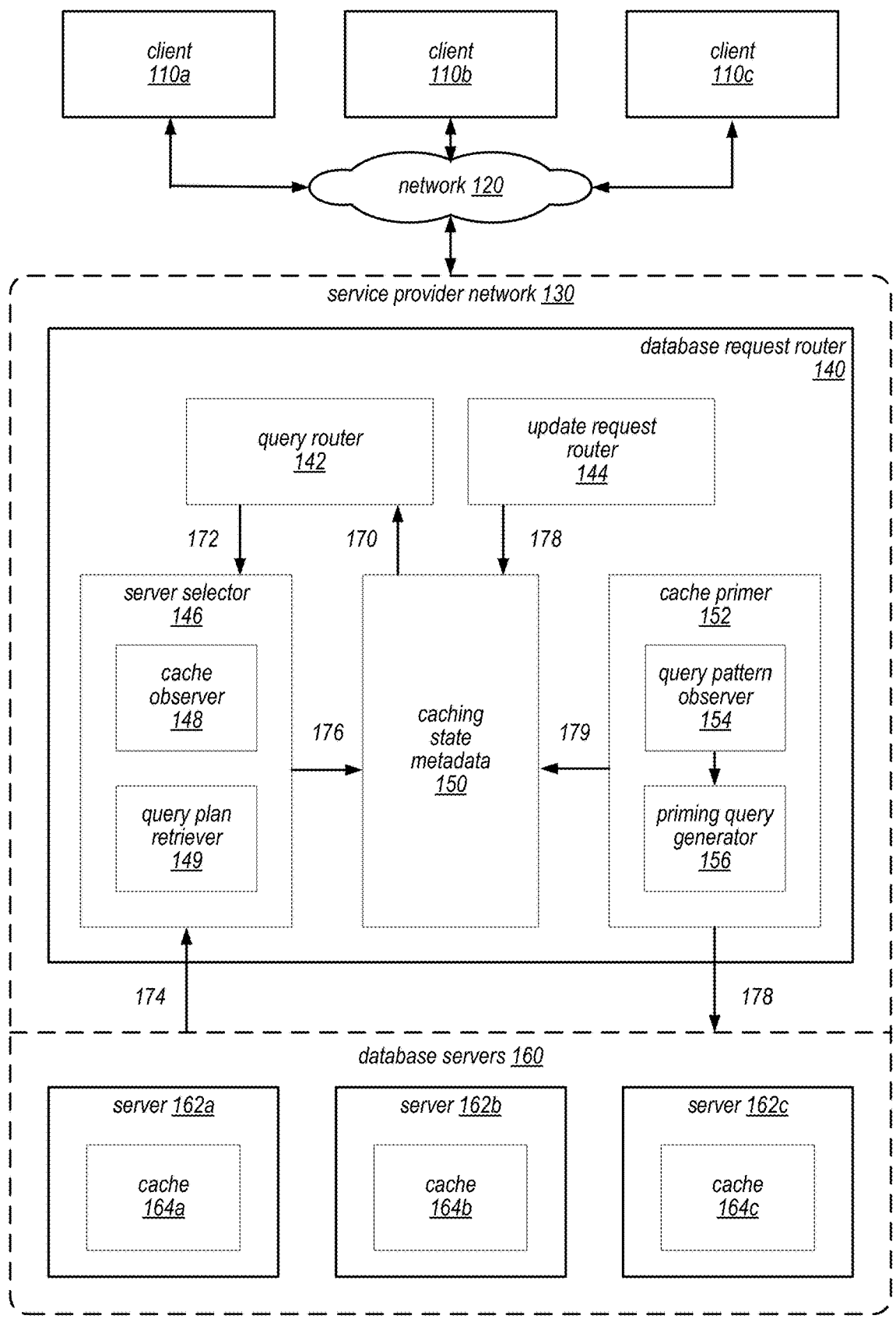

FIG. 1B is a block diagram illustrating another example system that uses a database request router that routes queries to multiple replica servers to improve cache utilization across the servers, according to some embodiments.

As shown, in this example system, a database system (e.g. database system 125) is implemented as part of a service provider network 130. In some embodiments, service server provider network may allow clients 110 to lease or use computing resources within the network 130. In some embodiments, the service provider network may provide to clients many different types of services, including a database service. In some embodiments, the database in the service provider network 130 may receive database statements from and send responses to the clients via a network 120. In various embodiments, the network 120 may encompass any suitable combination of networking hardware and protocols necessary to establish network communications between clients 110 and service provider network 130. For example, network 120 may encompass the various telecommunications networks and service providers that collectively implement the Internet. Network 120 may also include private networks such as local area networks (LANs) or wide area networks (WANs) as well as public or private wireless networks. For example, both a given client 110 and database may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and service provider network 130. In some embodiments, clients 110 may communicate with network-based database using a private network rather than the public Internet. For example, a client 110 may be provisioned within the same enterprise as the database and/or the underlying system described herein. In some embodiments, a client 110 may comprise a service that is offered by the same service provider that offers the database as a service.

In some embodiments, the service provider network 130 may be configured to implement one or more service endpoints configured to receive and process database statements, such as statements to access database objects maintained on behalf of clients/users by database servers 160, and/or the items and attributes stored in those database objects. For example, the database may include hardware and/or software configured to implement various service endpoints (such as replica servers 162a-c) and to properly receive and process database statements directed to those endpoints. In one embodiment, the database may be implemented as a server system configured to receive web services requests from clients and to forward them to various components that collectively implement a data storage system for processing. In some embodiments, the database may be configured as a distributed system (e.g., in a cluster topology).

As shown, the database provided by the service provider network 130 may implement a database request router 140, which may function in similar fashion as discussed in connection with FIG. 1A. As discussed, the request router 140 may include a query router 142 that forwards queries based on the contents of a caching state metadata 150. The query router 142 may read 170 and write 176 the caching state metadata 150 to reflect the caching states of the database servers 162.

In some embodiments, the caching state metadata 150 may be updated under a number of different conditions. In some embodiments, as shown, the request router 140 may implement an update request router 144. The update request router 144 may be tasked with routing update commands, such as SQL insert, update, or delete statements, to the database servers 160. In some embodiments, the database request router 140 may examine the update requests and determine that the caching states of database servers 160 may be changed by the update requests. For example, in some embodiments, certain data in the server cache 164 may be invalidated as a result of an update. In response, the request router 140 may modify 178 the contents of its own caching state metadata 150 accordingly. In some embodiments, this change to the caching state metadata 150 may be actively propagated to other request routers for the database in the request router fleet.

In some embodiments, the request router 140 may determine that the caching state of the servers will be changed by the very act of routing queries to the servers. Thus, the query router 142 may in some embodiments, actively update the caching state metadata 150. In some embodiments, when a new type of query is received, for example, a query type that is not stored in the caching statement metadata 150, the query router 142 may use a server selector 146 to select one or more servers for the new query type. In that event, the server selector 146 may select the database server based on one or more criteria, and then update 176 the caching statement metadata 150 to reflect the effects of its selection. For example, by directing a new type of query to server 162a, the new query may cause the contents of cache 164a to change. Those changes will be reflected in the caching state metadata 150 via the server selector 146.

In some embodiments, the server selector 146 may implement a cache observer 148. In some embodiments, the cache observer 148 may be configured to obtain 174 information about the caching state of individual servers 162 via an exposed API provided by the servers. For example, in some database implementations, the database server may allow users to obtain information about which tables, indexes, (and what portions of such objects), etc., are currently stored in its server cache. In some embodiments, the cache observer may obtain this information from the server to refresh the caching state metadata 150. Depending on the embodiment, this information may be gathered periodically or in response to detected events. In some embodiments, the results gathered by the cache observer 148 may cause the server selector 146 to proactive change which servers are assigned to which query types, as recorded in the caching state metadata 150.

As shown, in some embodiments, the server selector 146 may implement a query plan retriever 149. The query plan retriever 149 may be tasked with retrieving 174 query execution plans from the database servers 160. In some embodiments, these query execution plans may indicate database objects or other data that are used to execute a query. Such objects may include for example database indexes that are chosen by an optimization engine in the database server, as one example. In some embodiments, the database servers may expose an interface that allow clients to obtain the query execution plan, which may be provided as a machine-readable data structure or object. For example, certain types of SQL databases may provide an "explain" command that will explain the query execution plan for submitted queries.

In some embodiments, the query plan retriever 149 may be used to obtain database objects that are used for particular queries. This information may then be used to select database servers for different query types. For example, in some embodiments, the caching state metadata 150 may indicate whether individual servers are caching these types of data objects (e.g. indexes) in their cache. This information may be refreshed or updated based on results obtained by the query plan retriever 149 and then used to select servers for new query types or adjust server assignments of known query types.

As shown, in some embodiments, the database request router 140 may implement a cache primer 152. In some embodiments, the cache primer 152 may be configured to generate priming queries to one or more database servers ahead of expected queries of similar types. In this way, the caches of the primed database servers are prepared for the expected queries, so that expected queries can be performed more quickly.

In some embodiments, the cache primer 152 may include a query pattern observer 154. In some embodiments, the query pattern observer 154 may be implemented as a separate component, which may be run outside of the request router 140. In some embodiments, the query pattern observer 154 may monitor query traffic for the database. This monitoring may be performed for the entire database, so that multiple request routers may contribute information to determine the querying pattern. In some embodiments, the query pattern observer 154 may distinguish between multiple different query types, and record, for each query type, the times that these queries are received. Over time, a predictable pattern may be seen for a particular query type.

When a pattern is detected, in some embodiments, the cache primer 152 may schedule one or more priming queries to be sent to one or more of the database servers 160, to prepare the servers' caches for expected queries that are predicted by the pattern. In some embodiments, the database servers that are primed may be selected based on data from the caching state metadata 150. For example, if a particular server already has some of the desired objects for the query type in cache, that particular server may be primed. In some embodiments, if multiple query types are expected in the near future, a group of servers having overlapping caching states may be primed. In some embodiments, the cache primer 152 may also update the caching state metadata 150 as it performs the priming, to reflect the updated caching states of the database servers 160.

In some embodiments, the primary query is generated by the primary query generator 156. In some embodiments, the generator 156 may simply replay a previously seen query of the expected query type. Such previous query may be obtained for example from a query log, or may be saved as part of the observed querying pattern. In some embodiments, the priming query generator 156 may be configured to issue the priming query at a particular time. The priming time may be chosen so that it is during a period of low activity of a database, so that it does not impact existing database operations or disrupt existing caching states of the servers. In some embodiments, the priming may be performed at night or during a quite period predicted by the querying pattern. In some embodiments, the priming may be performed on a short time before the time of the expected queries.

Figure 2A:
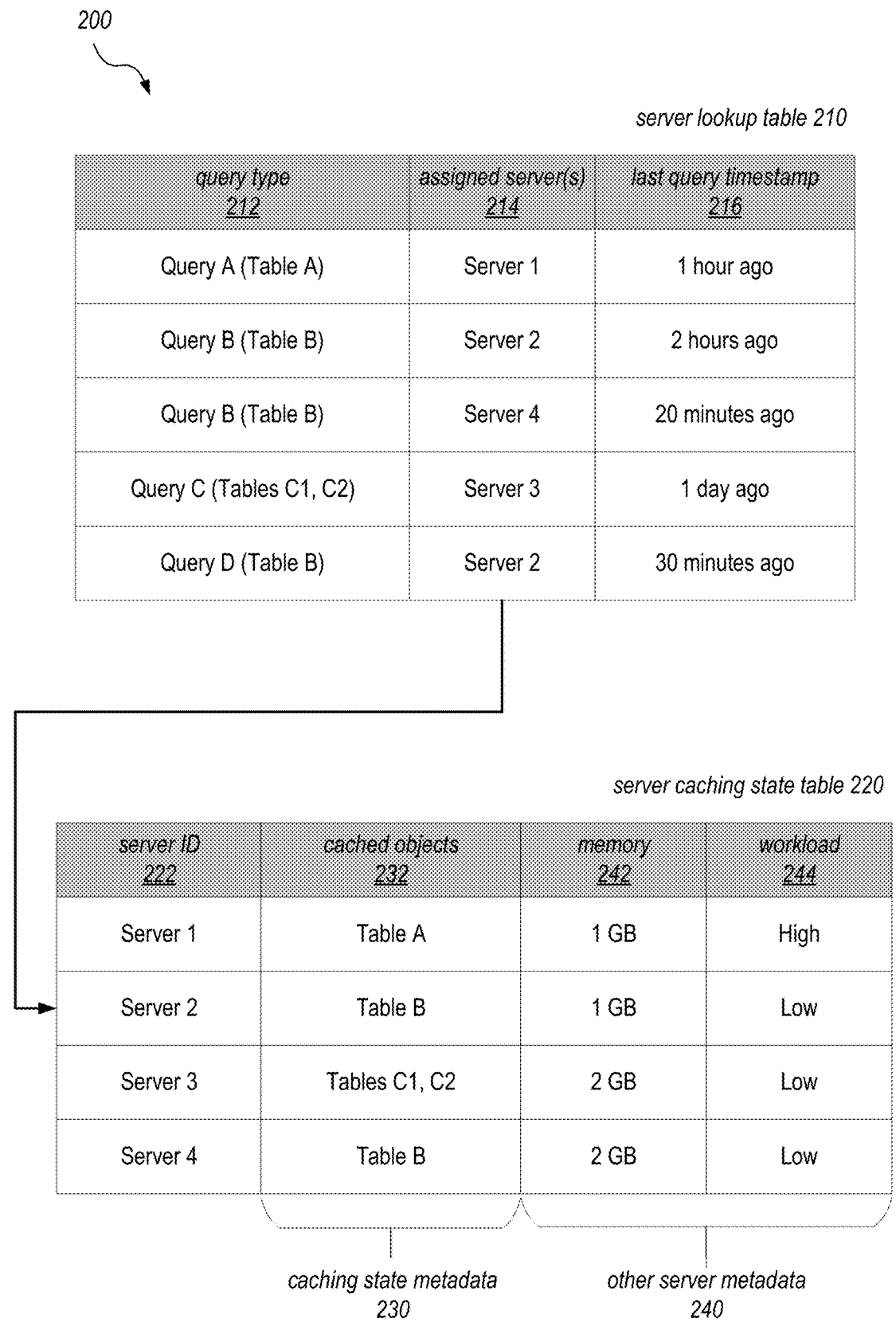
FIGS. 2A and 2B illustrate example caching state metadata that may be maintained by a request router to route queries to improve cache utilization across database servers, according to some embodiments.
Figure 2B:

FIGS. 2A and 2B illustrate example caching state metadata that may be maintained by a request router to route queries to improve cache utilization across database servers, according to some embodiments.

Referring first to FIG. 2A, an example caching state metadata 200 is shown. In this example, the caching state metadata contains two tables, a server lookup table 210 and a server caching state table 220. As shown, the server lookup table 210 indicates a list of observed query types 212, and a list of assigned servers 214. The table also indicates a last query timestamp 216, which records the last time that a query of the indicated query type was sent to that server.

In some embodiments, the server lookup table 210 may be maintained in the volatile memory of a request router, such as request router 140 of FIG. 1A. The server lookup table may be used to quickly decide which servers have desired caching states for different incoming queries. As discussed, in some embodiments, whether a server has the desired caching state for a query may only be one factor that determines how the query is routed. In some embodiments, the servers in column 214 may change, based on detected changes in the caching states of the servers.

Depending on the embodiment, the values in the query types column 212 may reflect different properties of the queries. In some embodiments, the values may simply reflect the text of a query statement, such as a SQL select statement. In some embodiments, the values may reflect a portion of the query statements, such as the fetch columns or query predicates. In some embodiments, the query may comprise a data object, and value in column 212 may represent a serialized representation of the salient properties of the query, such as for example the database objects (e.g. tables) accessed, and columns specified, etc. In some embodiments, incoming queries may be quickly parsed or hashed to resolved to one of the query types, so that a lookup can be performed on the server lookup table 210 to quickly find servers with the desired caching states.

In some embodiments, the timestamp field 216 may be used to keep track of how long ago a particular caching state for a query type was used. In some embodiments, this field may be used by the request router to manage the contents of the server lookup table 210. For example, if a query type has not been sent to a particular server for a long time (e.g. 24 hours), the association between that query type and the server may be removed from the server lookup table, keeping the table to a relatively small size. In some embodiments, it may be known that the database server will invalidate cached objects from its cache after a length of inactivity. In that case, the request router may use the timestamp value to periodically issue dummy queries to the database server, to ensure that the caching state of that server is maintained. In some embodiments, the timestamp value may also be used to select a server for a query type. For example, in one embodiments, servers having the most recent timestamp value for a query type may be preferred, as that server will most likely have the expected caching state indicated in the metadata.

As shown, in this example, the caching state metadata 200 also include a server caching state table 220. This table has one row per server, keyed by a server ID 222, and indicating the salient properties of the table, for example, cached objects 232, memory 242, and workload 244. As shown, the table may in some embodiments carry both caching state metadata 230 and also other server metadata 240. In this example, the caching state metadata includes the objects (e.g. tables) specified by the query. As discussed, such information may be inferred by the request router by its routing operations, or in some embodiments actually gathered from the database servers, for example via the cache observer 148 of FIG. 1B. This caching state information may be used to select database servers for new queries, among other things.

In some embodiments, the other server metadata 240 may also be used to select database servers for different query types. For example, in some embodiments, the memory 242 of the server may be used. In some embodiments, servers with larger memory sizes may be assigned as targets for more query types, depending on the volume of each query type. In some embodiments, larger database objects (e.g. larger tables) may be assigned to servers with bigger memory capacities. In some embodiments, the workload 244 of a server may also be used to assign query types. In some embodiments, the request router may attempt to balanced the volume of a particular query type across multiple servers, to ensure that no single server is dominated by the query type.

As shown in this example, in server lookup table 210, Query A (one type of query) uses Table A, and is assigned to Server 1. Looking at server caching state table 220, not surprisingly, Server 1 has Table A indicated as one of its cached objects. In table 210, Query B (another query type) is assigned to two servers, Servers 2 and 4. In some embodiments, the request router may assign multiple servers to a query type, for example, to split the load for that particular type across multiple servers, or to maintain high available of servers with desired caching states for this type of query. Not surprisingly, in table 220, Servers 2 and 4 both have Table B indicated as a cached object. Table 210 also shows a query type Query C, which uses two different tables C1 and C2. For example, this query type may involve a join of the two tables C1 and C2. As shown in table 220, both tables C1 and C2 are cached at Server 3 assigned to Query C. Finally, table 210 indicates a query type Query D, which also uses Table B. As shown, Query D is assigned to Server 2, which is caching Table B. Thus, in some embodiments, the request router may attempt to group query types that use common database objects together, so that the are directed to servers with caching states that are needed by all query types in the group. In this example, since both Query B and Query D use Table B, they are grouped together and assigned to a single server Server 2. This arrangement allows Server 2's cache to specialize for Table B, which is needed by both Query B and D.

Turning now to FIG. 2B, FIG. 2B show a later state of the caching state metadata 200. In this example, two new queries types E and F, shown as 250 and 260 respectively, as been observed by the request router.

In table 210, new Query E is shown to use Table A. In table 220, Server 1 is shown as caching Table A, as shown by 255. Thus, in this example, the request router may elect to assign Query E to Server 1, as shown in table 210. As discussed, in some embodiments, the request router may group query types that use similar objects together, so that they can take advantage of the caching state of a common server.

In table 210, new Query F is shown to use Tables C1 and C3. In table 220, Server 3 was caching C1 and C2 as discussed in FIG. 2A. Because that server already has part of the caching state required by Query F (i.e., Table C1 is already cached at Server 3), that server is selected as the assigned server for Query F. After Query F is routed to Server 3, the server caching state table 220 may be updated to reflect that Server 3 now has Tables C1, C2, and C3 in its cache. By selecting Server 3 for Query F, the request router intelligently chooses to use a server that already has part of the caching state needed by Query F. In some cases, this selection may reduce the latency of servicing the first instance of Query F. The selection also assignes the query types in an efficient manner to minimize disruption to the other servers.

Figure 3:
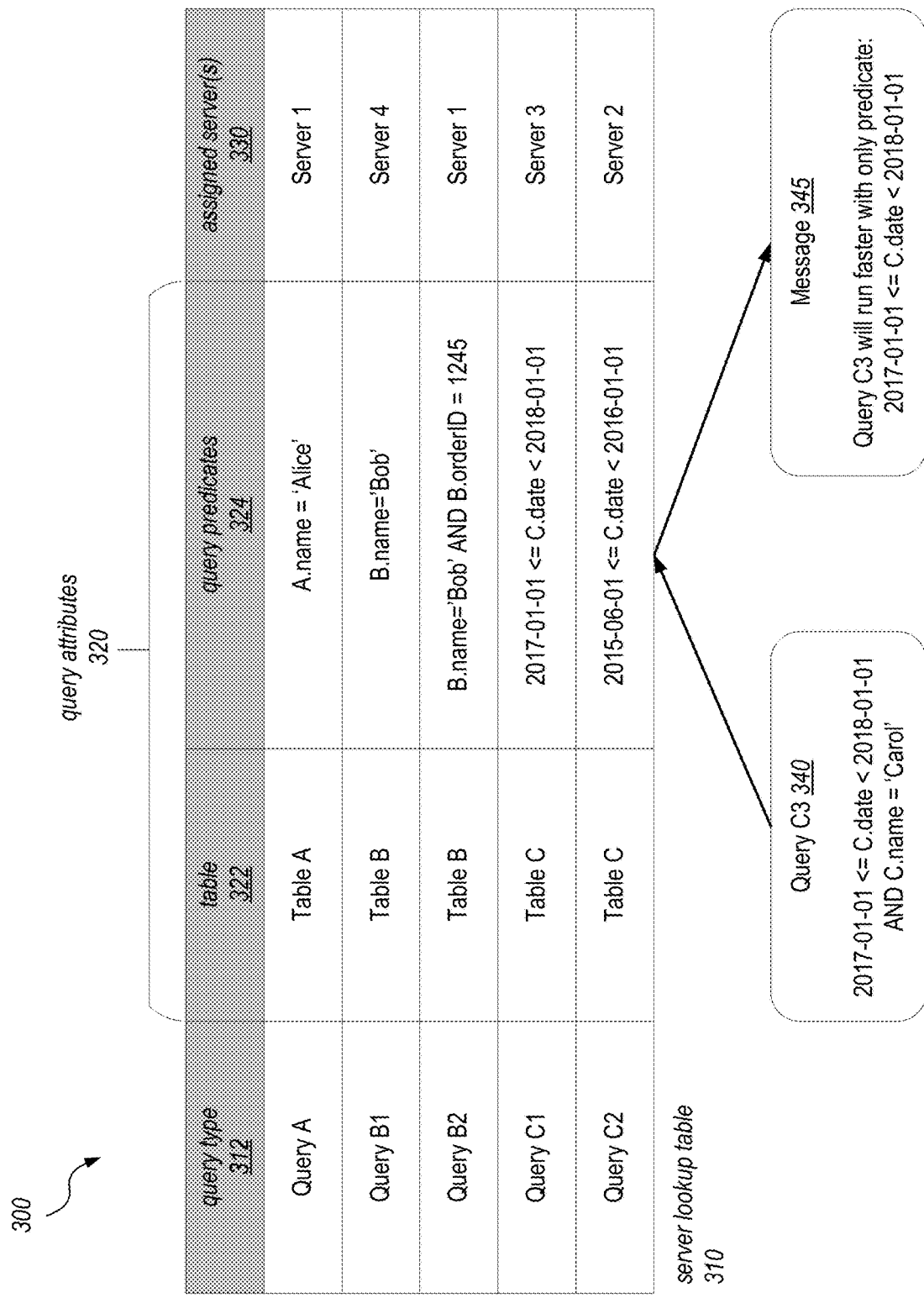
FIG. 3 illustrates another example of caching state metadata that may be maintained by a request router to route queries to improve cache utilization across database servers, according to some embodiments.

FIG. 3 illustrates another example of caching state metadata that may be maintained by a request router to route queries to improve cache utilization across database servers, according to some embodiments. As shown, caching state metadata 300 in this example includes server lookup table 310. The server lookup table 310 may be used to lookup a target database server for a particular query type, as discussed in connection with FIG. 2A.

In this example, the server lookup table 310 indicates different query types 312, and the table(s) 322 and query predicate(s) 324 used in each query type. In some embodiments, these query attributes 320 of the query type may be extracted from incoming queries via a limiting parsing of the query statement. In some embodiments, the incoming query may be presented as a data structure, and these attributes 320 may be readily retrieved from the data structure. In this example, each query type is distinguished not only by the table that it read from, but also the query predicate(s) that it uses. Thus, as shown, Query B1 and Query B2 are indicated as two different query types, because the two use different query predicates.

In some embodiments, queries having different query predicates may be executed different by the database servers, and using different database objects (e.g., query indexes). Additionally, based on the columns or attributes involved in the queries, different query results may be cached by the database server. Accordingly, in some embodiments, queries having different query predicates are independently assignable by the request router. As shown, for example, query types B1 and B2 are shown as assigned to different servers Server 4 and Server 1, even though they are reading from a common table (Table B).

In some embodiments, other aspects of an incoming query may be used to determine a query type. For example, in some embodiments, the select columns or attributes specified by the incoming query may be used to determine a distinct query type. Thus, for example, queries having different select columns or attributes may be assigned to different database servers in the lookup table 310.

Moreover, in some embodiments, queries having different query values may also be assigned to different servers. For example, query types C1 and C2 both query from Table C, and both are querying based on the data field for Table C. However, the two query types indicate different search ranges for the date field. In some embodiments, this difference may cause the request router to classify these queries as two different query types, which are independently assignable to different servers. In some embodiments, this classification is useful where different servers can cache different portions of a data object. For example, in some embodiments, Server 3 may cache a part of Table C or an index on the date field corresponding to the range indicated by Query C1, and Server 2 may cache another part of Table or an index on the data field corresponding to the range indicated by Query C2. Thus, each server's cache is maintaining respective portions of data that are used to service the two query types, and they are individually adapted to execute the two different types of queries C1 and C2.

In some embodiments, to keep the size of the server lookup table 310 to a relatively small size, the request router may implement a policy or one or more criteria to only add certain query types to the lookup table, and/or remove certain query types from the lookup table. In some embodiments, the request router may keep a count of each query type, and only query types that surpass a certain hit count or frequency threshold are added to the lookup table. Thus, only frequently encountered queries (e.g. those that benefit the most from server caching) are routed using the caching states of the servers. In some embodiments, based on the count or frequency metric of different query types, a query type may be removed from the lookup table. In some embodiments, the removal may be determined by a last query timestamp value for a query type, as discussed for example in FIG. 2A. Thus, when a query type becomes "cold," the request router may no longer track the caching states for that query type. In some embodiments, the policy to add and remove entries from the lookup table 310 may be configurable via a configuration interface.

In some embodiments, the request router may server an additional function to recommend a revision to a received query, based on the caching state metadata 300 that it maintains. This is illustrated by Query C3 340, which uses a query predicate that is similar to the query predicated associated with Server 3. As shown, Query C3 340 searches for date values between "2017, 01 Jan." and "2018, 01 Jan." (the same as the query predicate associated with Server 3), and also rows or item with name values of "Carol". The combination of these two predicates means that no server is caching the results set of Query C3 as presented. However, in some embodiments, the request router may recognize that if Query C3 were revised to not use the "name" predicate, it may be executed very quickly on Server 3, because Server 3 already has cached data or results for the first condition specified in the query. In some embodiments, based on this recognition, the request router may generate a message 345, which indicates to a client that Query C3 will run faster (using the caching state of Server 3) with only the "date" predicate. In some embodiments, as discussed, the request router may define query types based on the select column or attributes of queries. Accordingly, in some embodiments, the revision message 345 may indicate to the user that if one or more select columns or attributes are removed from the query, the revised query may be serviced more quickly using a matching server. In some embodiments, this message 345 may be generated as a warning to the query, which may be handled or ignored by the client. In some embodiments, the request router may issue the message and not proceed with the query until the client indicates a feedback either approving or canceling the query.

Figure 4:
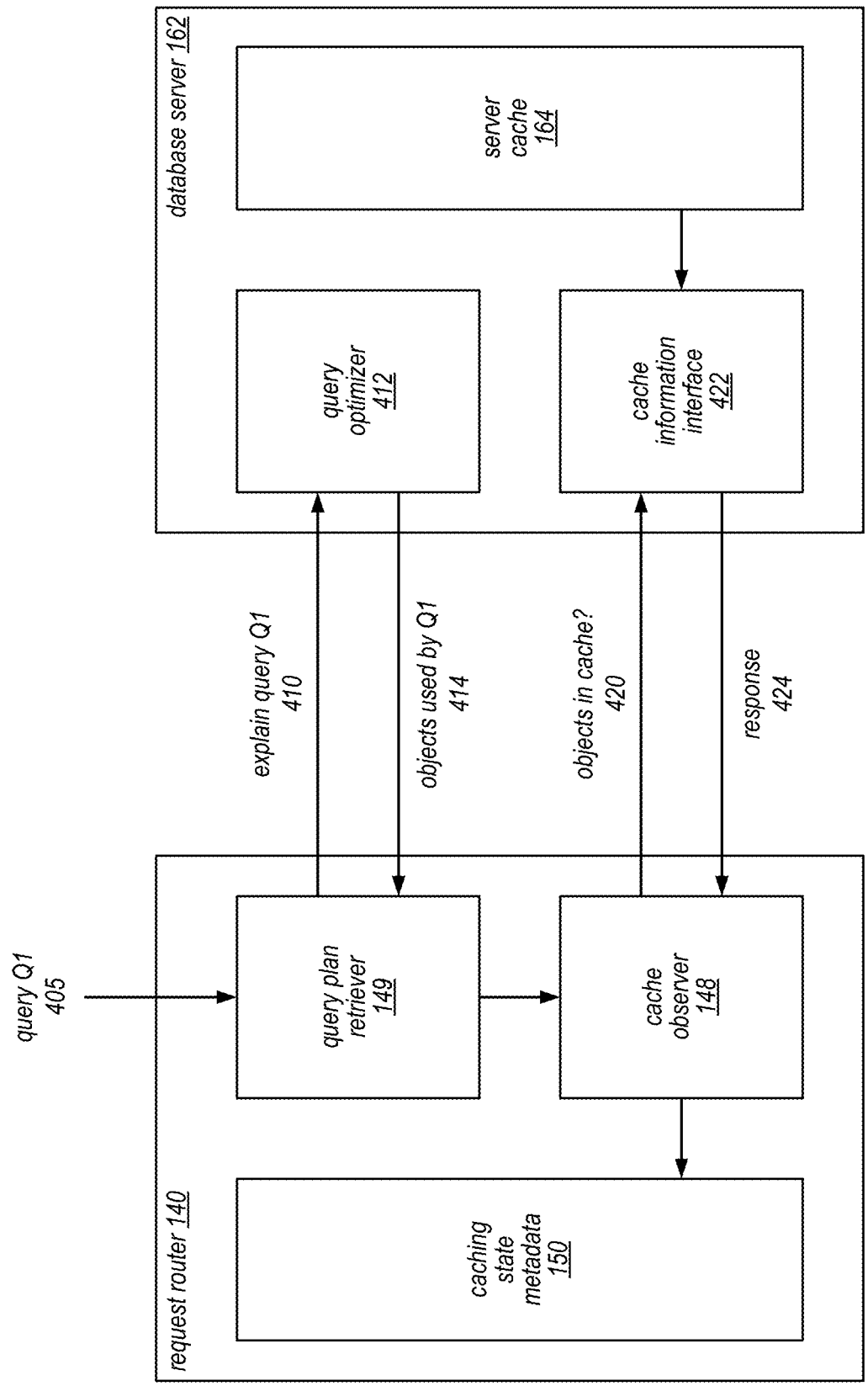
FIG. 4 is a diagram illustrating example behavior of a database request router to obtain database objects used by a query from a database server, according to some embodiments.

FIG. 4 is a diagram illustrating example behavior of a database request router to obtain database objects used by a query from a database server, according to some embodiments. As discussed, in some embodiments, the request router 140 may obtain from one or more of the database servers 162 the database objects that are used by an incoming query. This may be done for example when the request router encounters a new type of query that is not current present in its caching state metadata.

As shown in the figure, the request router 140 receives a query Q1 405. This query may be for example a new type of query that has not been assigned to any database server in the request router's caching state metadata 150. When a request router determines the Q1 is a new type of query, it may use the query plan retriever 149 to issue a request 410 to the database server 162 to obtain a query execution plan 414 from the database server.

In some embodiments, the database server 162 may run a query optimizer 412, which may in some embodiments be a part of the database query engine. In some embodiments, the query optimizer 412 may be responsible for generating an execution plan for incoming queries. In some embodiments, the optimizer 412 may itself be queried to provide execution plans for particular queries. The execution plan may in some embodiments be obtained without actually executing the query. For example, in some SQL database systems, the database system may expose a SQL explain command to provide the query execution plan. The query execution plan my indicate a set of database objects used to execute the query, including objects not specified by the query itself, such as for example various indexes that are used to perform the query. These used objects are returned 414 by the optimizer 412, as shown.

When the objects used by query Q1 are obtained by the request router 140, in some embodiments, this information is used to determine which database server should be assigned to the query. In some cases, this decision may be made based on the existing data in the caching state metadata 150, which may already have up-to-date caching information for the database objects used by the query. In some embodiments, the information may be handed off to a cache observer 148, as shown, to perform another request 420 to determine whether the database objects used by query Q1 are in the database server's cache 164.

In some embodiments, the request 420 may be sent to multiple or all of the database servers in the database. In some embodiments, the database servers 162 may provide a cache information interface 422 to allow clients to determine which (and to what extent) objects are cached in its cache 164. For example, in some SQL databases, the database system may expose a set of tables containing information about the cache 164 and allow clients to query whether particular objects (e.g. a table, an index, etc.) are in the cache, and to what extent (e.g., the number of pages for a particular object) are in its buffer cache. This information is returned in a response 424 to the request 420.

With this information about the caching state of the objects used by query Q1, the request router 140 may now select one or more database servers to use for query Q1 and similar queries of the same type. The query Q1 may then be forwarded to the selected database server, and the caching state metadata 150 may be updated to reflect the changes to the database server's cache as a result of handling query Q1. In some embodiments, the request router 140 may issue another query to the cache interface 422 to obtain this information. In some embodiments, the request router 140 may periodically poll the database servers via the cache interface 422 to refresh its caching state metadata 150.

Figure 5:
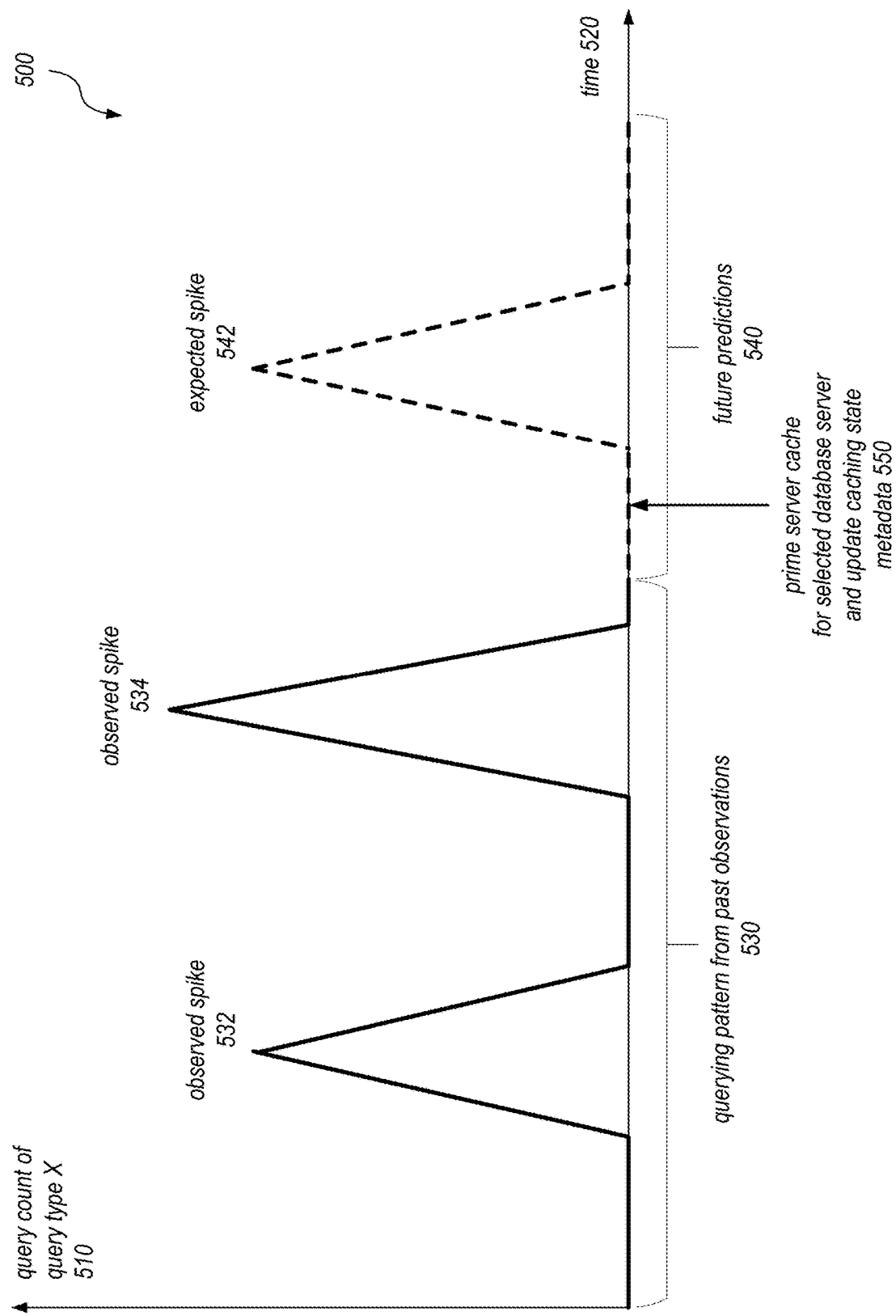
FIG. 5 is a diagram illustrating a querying pattern that may be used to proactively prime the cache of a database server ahead of expected query traffic, according to some embodiments.

FIG. 5 is a diagram illustrating a querying pattern that may be used to proactively prime the cache of a database server ahead of expected query traffic, according to some embodiments. As discussed, in some embodiments, the request router (e.g. request router 140 of FIG. 1A) may obtain a querying pattern of the database, and then use that querying pattern to performing priming of the database servers to prepare for expected queries in the future.

The figure depicts a querying pattern 500 seen by the database for queries of query type X. In this example, the vertical axis shows the query count 510 of query type X seen over time, and the horizontal axis indicates time 520. In the figure, the solid part of the curve indicates actually observed data 530 in the past, and the dotted part of the curve indicates future prediction 540 that is predicted based on the past data. In some embodiments, the past observations may be gathered from all database servers or all request routers in the database over a period of time. In some embodiments, the predicted data may be generated by a system outside of the request router. In some embodiments, the predictions may be generated using a machine learning system. In some embodiments, collection of this query traffic data and prediction of future query traffic may be performed continually by the database system.

As shown, in the observed data 530, there are two spikes in the query count for query type X at points 532 and 534. As may be seen, these spikes occur in a regular and predictable pattern. For example, in some cases, the spikes may be generated by particular clients or jobs that occur on a regular (e.g. daily) basis. Based on these observations, a prediction system may infer that there will be an expected spike 542 in query traffic for query type X in the future.

In some embodiments, the request router may be able to access the prediction information for query type X, and generate a priming query to prime the server cache of a selected database server ahead of the expected spike 542. In some embodiments, the priming query may be a replay of a previously seen query by the request router. In some embodiments, multiple priming queries may be issued to a single server. In some embodiments, the request router may issue the priming query during a period of low activity in the database, so that the priming does not adversely affect ongoing activity in the database. In some embodiments, the priming may occur a short time before the expected spike 542 in query activity, as shown.

To perform the priming, in some embodiments, at operation 550, the request router may select one or more servers to handle the expected queries. The selection may be performed using the caching state metadata maintained by the request router, as discussed. In some embodiments, the request router may select a database server that already has part of the desired caching state for the expected queries, so that the priming does not unnecessarily disrupt the existing caching state of the database servers. In some embodiments, the selection of servers may be based on the properties or capabilities of different database servers. For example, in some embodiments, the servers may have been rebooted and so they are not caching any data for servicing queries. In some embodiments, the request router may assign the expected query to a new server a property of the new server (e.g., its memory size, cache capacity, etc.). In some embodiments, the database servers of a database system may be heterogenous, and certain servers may be better equipped to handle certain types of queries (e.g. a query that requires a large data object to reside in memory). In some embodiments, the request router may intelligently designate different servers as different specialization groups for particular cached content. For example, a first set of servers may be selected for caching one set of database objects, and a second set of servers may be selected to cache another set of database objects. Along with the priming, the request router may also update its caching state metadata to reflect caching state changes caused by the priming.

Figure 6:
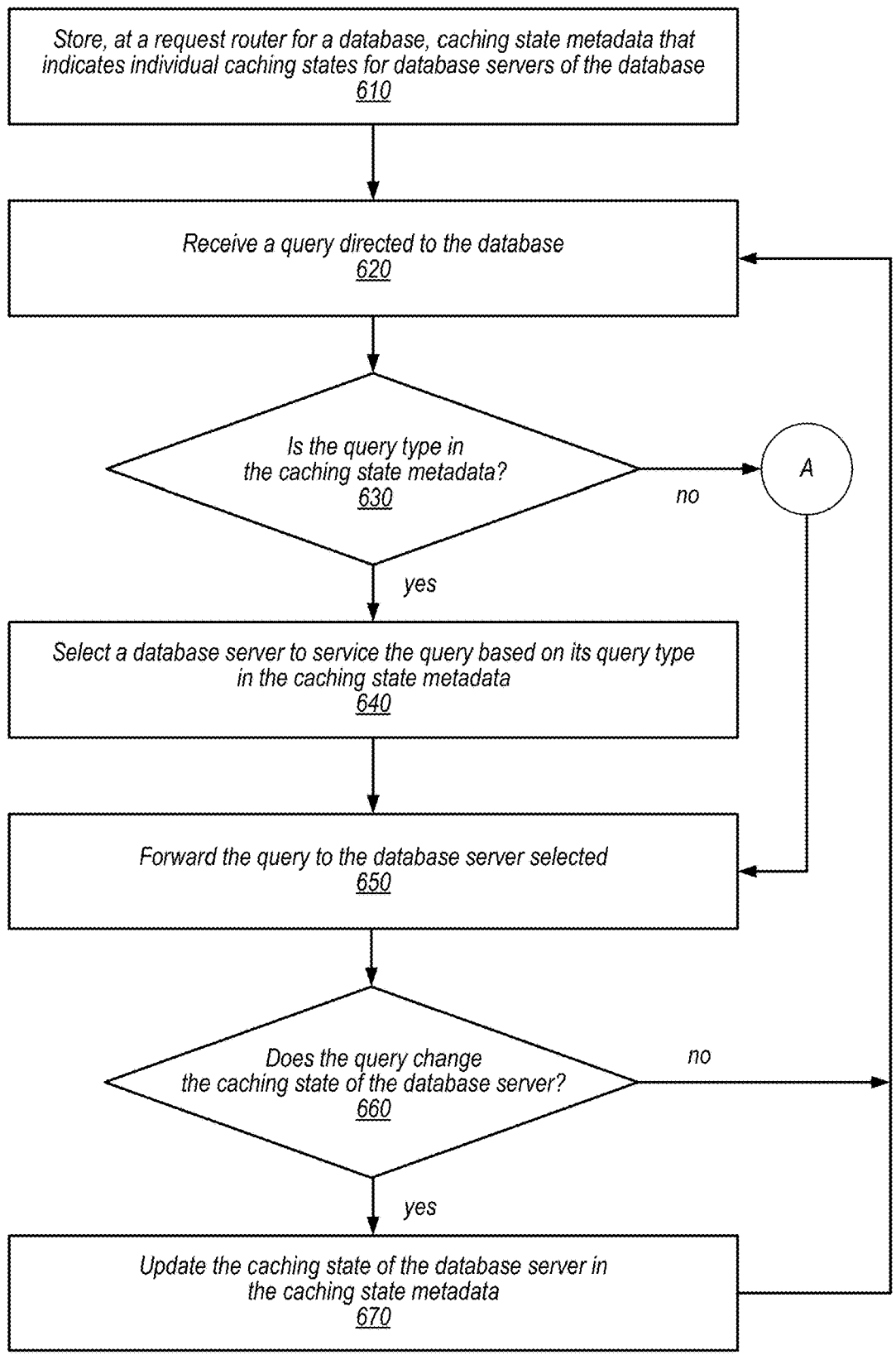
FIG. 6 is a flowchart illustrating a process performed by a database request router to route queries from database clients to database servers, according to some embodiments.

FIG. 6 is a flowchart illustrating a process performed by a database request router to route queries from database clients to database servers, according to some embodiments. The process depicted in figure may be performed, for example, by the request router 140 of FIG. 1B, as discussed.

The process begins at operation 610, where caching state metadata is stored at the request router. The caching state metadata may indicate respective caching states for individual database servers of a database. The caching state metadata may be, for example, caching state metadata 150 as discussed in connection with FIG. 1B. In some embodiments, the caching state metadata may include a server lookup table that maps different query types to database servers with desired caching states for that query type. In some embodiments, the caching state metadata may also include details about the caching state at the different database servers (e.g., which objects are stored at their respective caches and to what extent), to allow the request router to intelligently assign servers to new types of queries. In some embodiments, the request router may keep the caching state metadata current by, for example, updating the metadata based on its own routing behavior, invalidating information in the metadata as a result of update requests to the database, or periodically polling for caching state information from the database servers themselves.

At operation 620, a query is received that is directed to the database. As discussed, the request router is responsible for routing queries to the database servers. The queries may be, for example, SQL queries. In some embodiments, the queries may be presented in different formats, for example, as JSON objects or web service calls.

At operation 630 a determination is made whether the query type of the query is in the caching state metadata. In some embodiments, individual queries may be reduced to query types, and these query types are used as lookup keys to look up database servers to use for individual queries. In some embodiments, the query type may simply be the text of the query statement. In some embodiments, the query type may be defined based on the set of query predicates specified in the query. In some embodiments, the query type may be defined by database objects (e.g. tables) read by the query. In some embodiments, the query type may be defined by other properties of the query. After the query type for the query is determined, a check is made whether the query type is in the caching state metadata (e.g., whether the request router has already seen the query type before). If not, the process proceeds to subprocess A to select a database server for this new query type, as discussed in connection FIG. 7. If the query type is already in the caching state metadata, the process proceeds to operation 640.

At operation 640, a database server is selected to service the query based on its query type in the caching state metadata. As discussed, in some embodiments, the caching state metadata may include a server lookup table to immediate provide ready servers for the query type. In some embodiments, the selection process may also include other factors such as the current health conditions of the servers, the current load of the servers, etc. Accordingly, in some embodiments, the caching state of the database server are is only one factor in the request router's routing decision. At operation 650, the query is forwarded to the database server selected.

At operation 660, a determination is made whether the caching state of the selected database server is changed due to the forwarding of the query. In some embodiments, the caching state of the database server may change because this is the first time that the database has serviced a query of this type. In some embodiments, small changes in the caching state of the server are not readily predictable by the request router, and the request router may obtain the caching state of the database server again after forwarding the query. For example, in some embodiments, the relevant caching state of the server may include a number of pages that are fetched by the server from disk and stored in memory. This information may be obtained from the database server after the query is performed.

At operation 670, if the caching state of the database server has changed, the request router updates the caching state metadata to reflect the change. For example, the caching state metadata may be updated to reflect that certain database objects are now cached by the database server, and in some cases change the number of pages of particular object that are now in cache. This updating keeps the caching state metadata up-to-date, so that the request router can make good routing decisions for next queries received.

Figure 7:
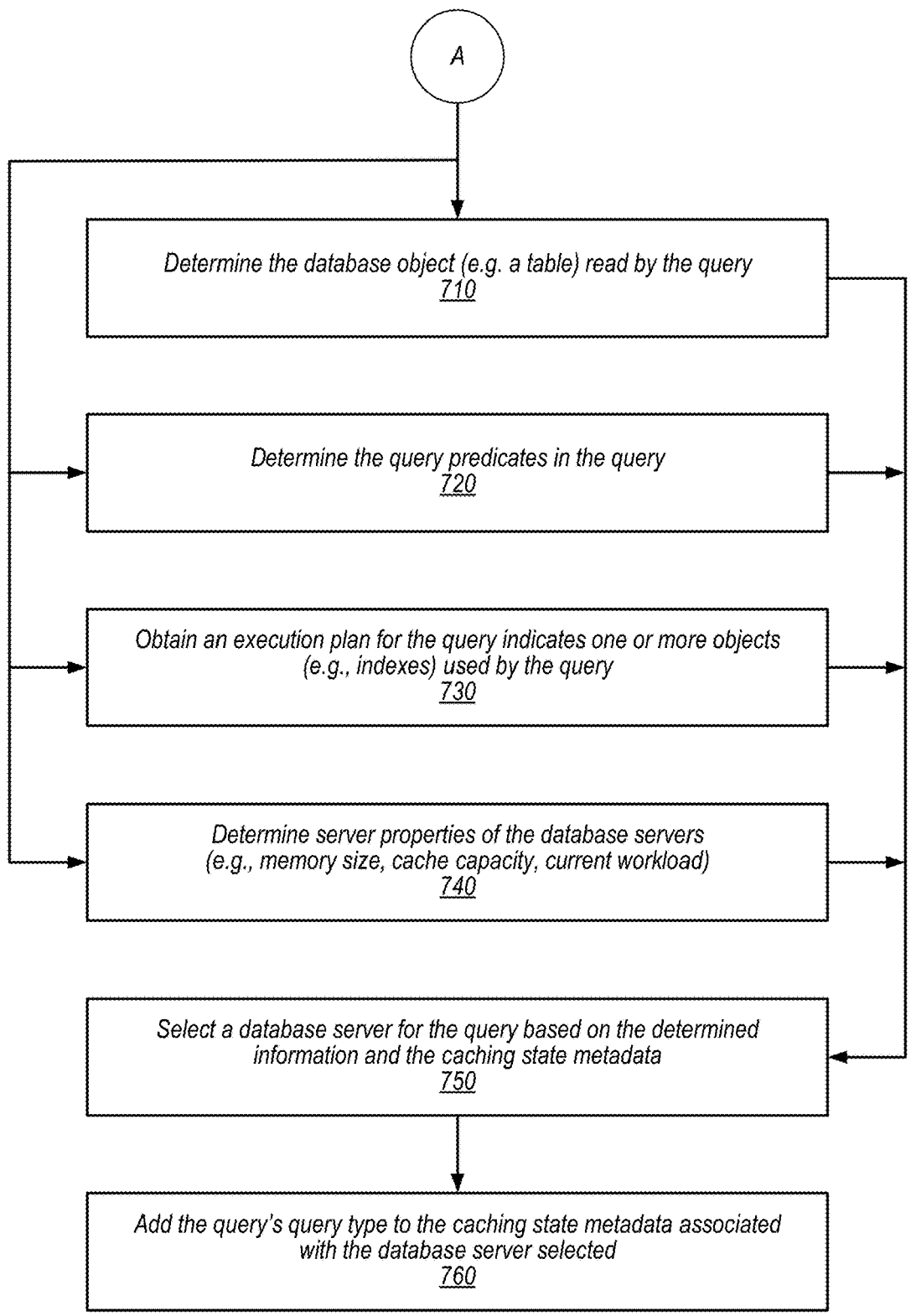
FIG. 7 is a flowchart illustrating a process performed by a database request router to select a database server for a new query type, according to some embodiments.

FIG. 7 is a flowchart illustrating a process performed by a database request router to select a database server for a new query type, according to some embodiments. The process depicted in figure may be performed, for example, by the request router 140 of FIG. 1B, as discussed.

The process depicted continues as subprocess A as seen in FIG. 6. At the start of the subprocess, it is determined that an incoming query to the request router is of a query type that is not in the caching state metadata of the request router. Thus, this query represents a new type of query and a new database server should be selected as assigned to the new query type. As shown, the process proceeds to make four types of determinations in operations 710, 720, 730, and 740. Depending on the embodiment, some of these determination steps may be optional or not be performed. All of these determinations are then used to make the decision in operation 750, where a database server is selected based on one or more of the determinations.

At operation 710, a database object specified by the query (e.g. a table) is determined. As discussed, in some embodiments, the caching state metadata may indicate which database servers are caching which database objects (e.g. tables) and the degree to which the database objects are in cache. Thus, the specified database object of the query may be used to select a database server for the query for better cache utilization.

At operation 720, the query predicates of the query are determined. In some embodiments, the database servers may cache particular data based on query predicates. For example, in some embodiments, a particular set of query predicates may cause particular objects (such as indexes) or a particular set of fetch results (e.g. data pages) to be brought into cache. In some embodiments, the caching state metadata at the request router may track this information, and the predicate set of the incoming query may be compared against this information to select a server for the query.

At operation 730, an execution plan of the query is obtained, where the execution plan indicates one or more objects (e.g indexes) used by the query. As discussed, in some embodiments, the database server may explicitly provide an execution plan for a given query, which indicates details such as database objects (e.g. indexes) to be used by the database server to service the query. In some embodiments, these types of objects may not be specified by the query itself. The request router may track the caching of these objects in the caching state metadata, and the query execution plan of the new query may be used to select a database server for the query.

At operation 740, server properties of the database servers are determined. Such server properties may be not dependent on the query. For example, in some embodiments, the server properties may include attributes such as the server's memory size, cache capacity, or current workload. In some embodiments, such information may be provided to the request router via polling or via periodic messages or heartbeats from the database servers. In some embodiments, such information is relevant to the caching state of the server and whether a particular server is a good choice for a particular query.

At operation 750, some or all of the determined information from operations 710, 720, 730, and 740 are used to select a database server for the query. In some embodiments where the database system includes multiple request routers, two request routers may receive a same type of query with a relatively short period of time, so that both request routers may make its own selection decision for that new type of query. In some embodiments, the selection algorithm for the new query type may be deterministic. That is, for a given caching state of the servers, two request routers will always select the same server for a query type. For example, the selection method may employ various deterministic tie-breaker steps (e.g., based on the server ID), so that two request routers that are selecting servers near the same time will generally select the same server for one query type. Using this approach, two request routers will not cause conflicting mappings in the caching state metadata. As discussed, the actual routing decision of the request router may depend on a number of other factors that are not related to the caching states of the servers. However, in some embodiments, the request router may assign one or more servers to particular types of queries as the servers with the best caching states for those queries. These assignments may be used as part of the overall decision to route queries.

At operation 760, the query's query type and the database server selected for the query type are added to the caching state metadata. As discussed, in some embodiments, the caching state metadata may associate query types with a group of database servers with desired caching states in a lookup table. The lookup table may then be used to quickly select the servers for incoming queries whose query types have been seen before by the request router. In some embodiments, this addition may be made as the query is routed to the selected server. In some embodiments, the addition may be performed after the query returns from the selected server. In some embodiments, the addition to the lookup table may only be made if the selected server successfully services the forwarded query. The latter approach allows the request router to ascertain that the selected server is a viable choice for the query type before officially assigning the query type to that server.

Figure 8:
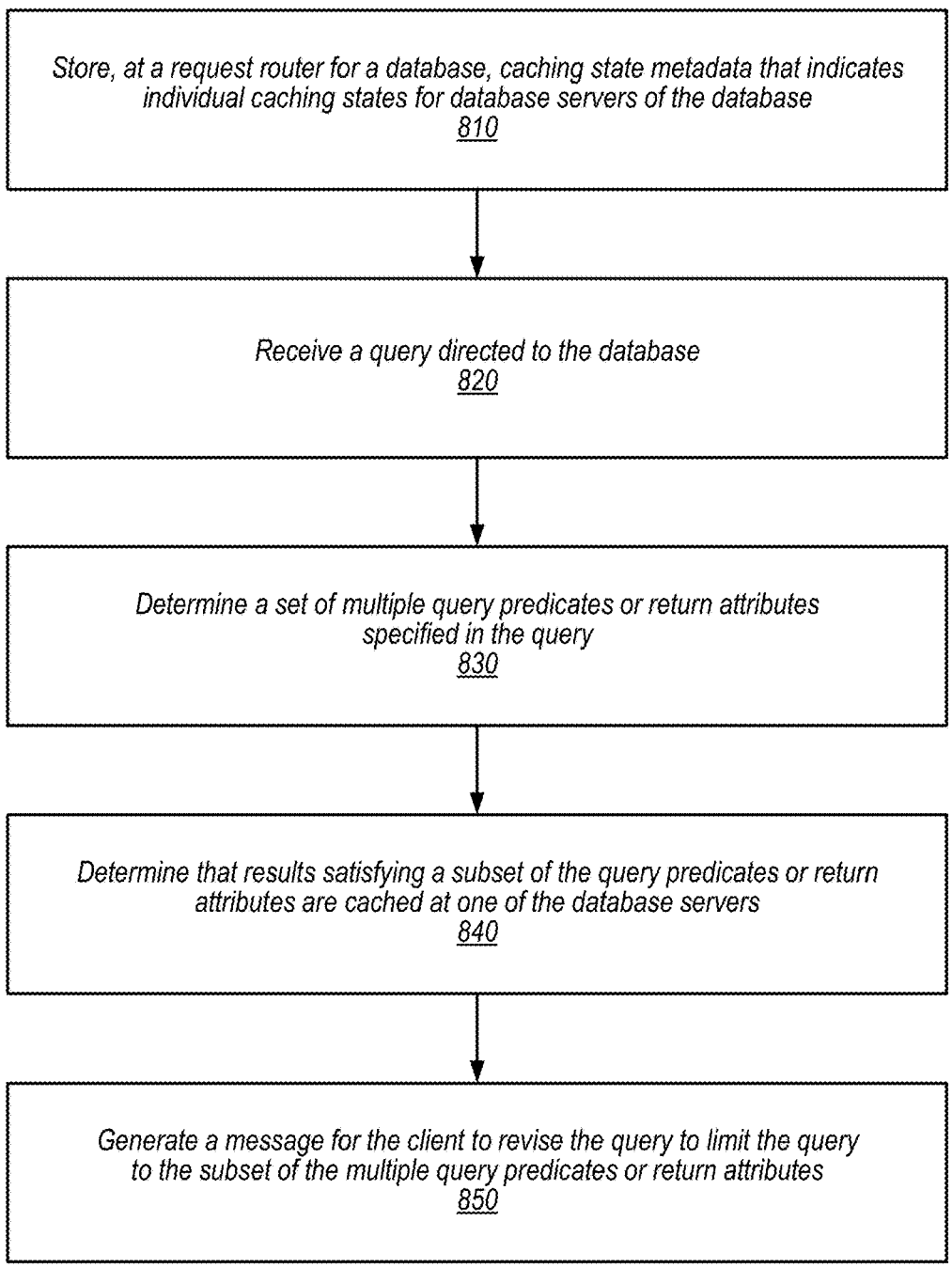
FIG. 8 is a flowchart illustrating a process performed by a database request router to generate a message to a query client recommending to revise its query for better cache performance, according to some embodiments.

FIG. 8 is a flowchart illustrating a process performed by a database request router to generate a message to a query client recommending to revise its query for better cache performance, according to some embodiments.

At operation 810, a request router for a database stores caching state metadata that indicates individual caching states for database servers of the database. The request router may be for example request router 140 of FIG. 1. Operation 810 may be performed in similar fashion as discussed in connection with operation 610 of FIG. 6.

At operation 820, a query directed to the database is received. Operation 820 may be performed in similar fashion as discussed in connection with operation 620 of FIG. 6.

At operation 830, a set of multiple query predicates or return attributes specified in the query are determined. In some embodiments, the determination may be performed by a limited parsing of the incoming query. For example, in some embodiments, the request router may parse a received SQL statement to determine the different WHERE clause conditions specified in the query statement. In some embodiments, the query predicates may simply indicate the different columns or attributes that are specified in the query conditions. In some embodiments, the query may be parsed to determine a set of return attributes, for example, the set of select columns or values specified in a SQL SELECT statement.

At operation 840, a determination is made that results satisfying a subset of the query predicates or return attributes of the query are cached at one of the database servers. As discussed, in some embodiments, the request router may maintain caching state metadata for each of the database servers. In some embodiments, the caching state metadata may indicate which database servers have cached data or cached query results for different sets of query predicates or return attributes. As discussed, servers with such cached data or query results may be able to service queries having the matching query predicates or return attributes much more quickly. However, in some cases, no server may be found with a full match of the query predicates or return attributes of the incoming query. Rather, the caching state metadata indicates that one of the database servers have cached data for only a subset of the query predicates or return attributes of the incoming query.

At operation 850, the request router generates a message for the client recommending to revise the query to limit the query to the subset of the multiple query predicates or return attributes. In some embodiments, because the request router has insight into the caching states of the servers, it is in a position to inform the client that certain adjustments to the incoming query can take full advantage of the current caching state. For example, the request router may recognize that by removing just one condition from the query's set of predicates, or just one selected column from the query return attributes, the entire set of query results may be returned directly from cache via a single database server. In this situation, the request router may inform the client of the potential optimization via a warning or information message. In some embodiments, the request router may forward the query as normal but generate the message at the same time, so that the client may elect to cancel the query after seeing the message. In some embodiments, the request router may refrain from forwarding the query until a confirmation from the client approving the query.

Figure 9:
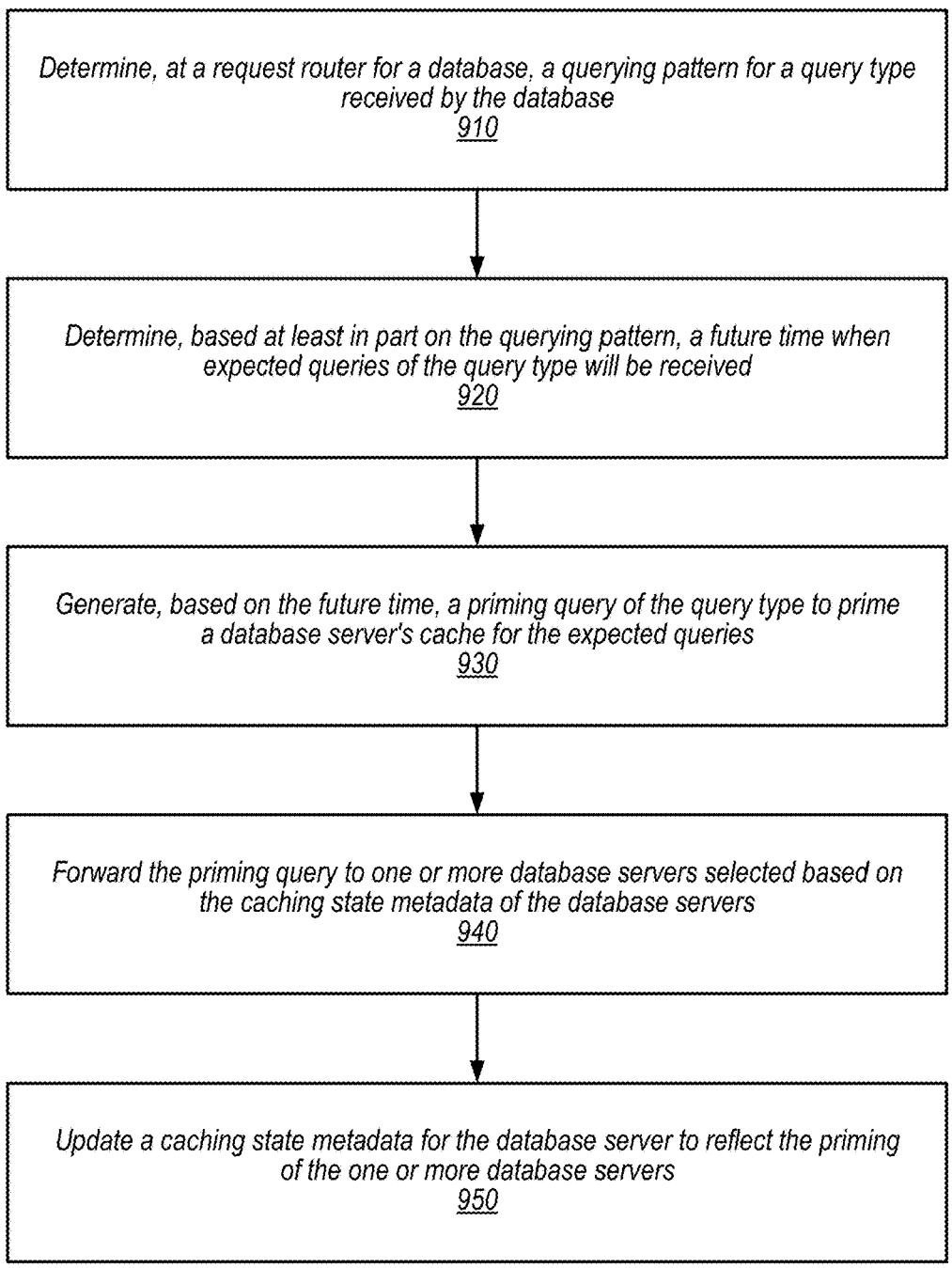
FIG. 9 is a flowchart illustrating a process performed by a database request router to prime the cache of a database server ahead of expected query traffic, according to some embodiments.

FIG. 9 is a flowchart illustrating a process performed by a database request router to prime the cache of a database server ahead of expected query traffic, according to some embodiments. The process depicted in figure may be performed, for example, by the request router 140 of FIG. 1B, as discussed.

At operation 910, a request router for a database determines a querying pattern for a query type received by the database. As discussed, in some embodiments, the request router may classify queries into query types that can be used to look up which database servers have desired caching states for each query type. In some embodiments, the request router or some other component of the database may monitor and track query traffic to the database, and save this information as a querying pattern for certain query types.

At operation 920, a determination is made, based on the querying pattern, a future time when one or more expected queries of the query type will be received by the database. In some embodiments, the querying pattern may be highly regular and predictable into the future. In some embodiments, the querying pattern may be used to predict when in the future queries of the particular query type are likely to be received. The actual act of prediction may be performed by the query router itself, or by some other component associated with the database. In some embodiments, such predictions may be made using a machine learning technique. In some embodiments, operations 910 and 920 may be performed in a background process in an ongoing basis.

At operation 930, the request router generates a priming query based on the predicted future time. The priming query may be of the same type as the one or more expected queries in the future. The priming query may be designed to prepare the cache of one or more database servers in anticipation of the expected queries, so that the expected queries can take full advantage of the prepare caching states of the servers. In some embodiments, the request router may select a previously query seen by the database to use as the priming query. In some embodiments, the request router may generate more than one priming queries.

At operation 940, the generated priming query is forwarded to one or more database servers selected for the expected queries. In some embodiments, the selection of the servers may be made based on caching state metadata maintained by the request router (e.g. caching state metadata 150 as discussed in connection with FIG. 1B). For example, the request router may discover that a particular database server already has a caching state that is close to the desired caching state for the expected queries. Accordingly, the request router may select that particular server to be primed, because the priming would cause minimal activity and disruption to that particular server. In some embodiments, the primary query may be forwarded at a time that the database is in a low-activity state, so as to not cause noticeable degradation in database performance.

At operation 950, the caching state metadata at the request router is updated. The update may be made to reflect the priming of the one or more database servers. For example, the caching state metadata may be updated to reflect that certain database objects needed by the expected queries are now cached at one or more of the database servers. Thus, if and when the expected queries do arrive at the request router, the request router may be able to quickly determine to use the one or more database servers for those queries. Because the database servers have already been primed, the arriving queries will immediately benefit from the caching states of the primed database servers.

Figure 10:
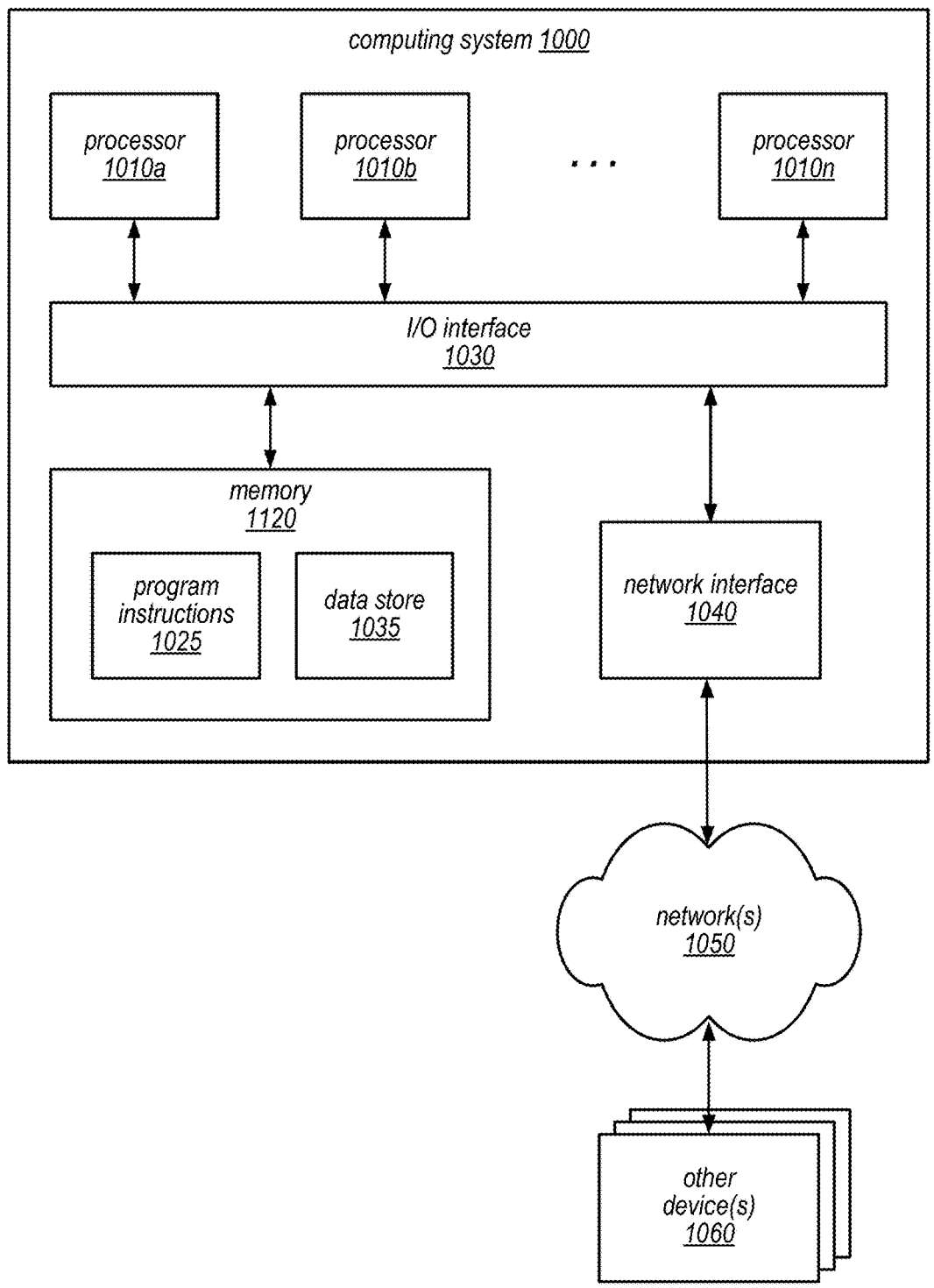
FIG. 10 is a block diagram illustrating an example computer system that can be used to implement one or more portions of a database request router that routes queries to multiple replica servers to improve cache utilization across the servers, according to some embodiments.

FIG. 10 is a block diagram illustrating an example computer system that can be used to implement one or more portions of a database request router that routes queries to multiple replica servers to improve cache utilization across the servers, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 920, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis.

However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
a plurality of database servers of a database system implemented by one or more computers comprising one or more hardware processors and memory, the database servers individually configured to:
store a replica of a database;
store cache data in a cache of the database server;
service queries directed to the database using the cache data stored in the cache;
a request router of the database system implemented by one or more computers comprising one or more hardware processors and memory, configured to:
obtain caching state metadata from the plurality of database servers, wherein the caching state metadata indicates data objects cached by individual ones of the database servers;

update a server lookup table that maps different types of queries to different ones of the database servers based at least in part on the data objects cached by the database servers;
receive a query directed to the database;
select a database server from the plurality of database servers to forward the query using the server lookup table; and
forward the query to the database server selected.

2. The system of claim 1, wherein:
the request router is configured to:
select a particular one of the database servers for a new query whose query type is not in the server lookup table; and
add the query type to the server lookup table, the query type associated with the particular database server.

3. The system of claim 2, wherein to select the particular database server for the new query, the request router is configured to:
determine that the new query is directed to one or more database objects; and
determine that the one or more database objects are cached at the particular database server.

4. The system of claim 2, wherein to select the particular database server for the new query, the request router is configured to:
obtain an execution plan for the new query; and
determine that one or more indexes used by the execution plan are cached at the particular database server.

5. The system of claim 1, wherein the request router is configured to:
determine a querying pattern for the database that indicates when one or more queries of a particular one of the different query types are received by the database;
determine, based at least in part on the querying pattern, a future time when one or more expected queries of the particular query type will be received;
generate, based at least in part on the future time, a priming query of the particular query type to one or more of the database servers to prime one or more caches of the one or more database servers for the one or more expected queries; and
update the caching state metadata to reflect the priming of the caches.

6. A computer-implemented method, comprising:
performing, by a request router of a database system implemented by one or more computers:
forwarding queries to a plurality of database servers of the database system, wherein the database servers are individually configured to store replicas of a database and cache data in a cache to service queries directed to the database;
obtaining caching state metadata from the database servers, wherein the caching state metadata indicates data objects cached by individual ones of the database servers;
updating a server lookup table that maps different types of queries to different ones of the database servers based at least in part on the data objects cached by the database servers;
receiving a query directed to the database;
selecting a database server from the plurality of database servers to forward the query using the server lookup table; and
forwarding the query to the database server selected.

7. The method of claim 6,
further comprising performing, by the request router:
selecting a particular one of the database servers for a new query whose query type is not in the server lookup table; and
adding the query type the server lookup table, the query type associated with the particular database server.

8. The method of claim 7, wherein selecting the particular database server for the new query comprises:
determining that the new query is directed to one or more database objects; and
determining, based at least in part on the caching state metadata, that the one or more database objects are cached at the particular database server.

9. The method of claim 7, wherein selecting the particular database server for the new query comprises:
determining that the new query specifies one or more query predicates or return attributes; and
determining that data satisfying the one or more query predicates or return attributes is cached at the particular database server.

10. The method of claim 7, wherein selecting the particular database server for the new query comprises:
obtaining an execution plan for the new query; and
determining that one or more indexes used by the execution plan are cached at the particular database server.

11. The method of claim 7, where selecting the particular database server for the new query is based at least in part on one or more of: a memory size, a cache capacity, or a current workload of the particular database server.

12. The method of claim 6, further comprising:
updating, by a request router, the caching state metadata to record a timestamp associated with the query forwarded to the database server.

13. The method of claim 6, further comprising:
performing, by the request router:
receiving a second query from a client specifying multiple query predicates or return attributes;
determining that results satisfying a subset of the multiple query predicates or return attributes are cached at least one of the plurality of database servers; and
generating a message for the client recommending to revise the second query to only include the subset of the multiple query predicates or return attributes.

14. The method of claim 6, further comprising:
performing, by the request router:
determining a querying pattern for the database that indicates when one or more queries of a particular one of the different query types are received by the database;
determining, based at least in part on the querying pattern, a future time when one or more expected queries of the particular query type will be received;
generating, based at least in part on the future time, a priming query of the particular query type to one or more of the database servers to prime one or more caches of the one or more database servers for the one or more expected queries; and
updating the caching state metadata to reflect the priming of the caches.

15. The method of claim 6, further comprising:
performing, by the request router:
receiving an update to the database modifying data in one or more database objects in the database;
determining that caching states for one or more of the database servers are changed by the update; and
updating the caching state metadata to reflect results of the changes.

16. The method of claim 6,
wherein the request router is one of a plurality of request routers for the database; and
further comprising performing, by the request router:
responsive to an update to the caching state metadata, sending one or more messages to one or more other ones of the plurality of request routers, the one or more messages indicating the update to the caching state metadata.

17. One or more non-transitory computer-accessible storage media storing program instructions that when executed on or across one or more processors of a request router of a database system, cause the request router to:
forward queries to a plurality of database servers of the database system, wherein the database servers are individually configured to store replicas of a database and cache data in a cache to service queries directed to the database;
obtain caching state metadata from the database servers, wherein the caching state metadata indicates data objects cached by individual ones of the database servers
update a server lookup table that maps different types of queries to different ones of the database servers based at least in part on the data objects cached by the database servers;
receive a query directed to the database;
select a database server from the plurality of database servers to forward the query using the server lookup table; and
forward the query to the database server selected.

18. The one or more non-transitory computer-accessible storage media of claim 17, wherein
the program instructions when executed on or across the one or more processors cause the request router to:
select a particular one of the database servers for a new query whose query type is not in the server lookup table; and
add the query type to the server lookup table, the query type associated with the particular database server.

19. The one or more non-transitory computer-accessible storage media of claim 18, wherein to select the particular database server for the new query, the program instructions when executed on or across the one or more processors cause the request router to:
obtain an execution plan for the new query; and
determine that one or more indexes used by the execution plan are cached at the particular database server.

20. The one or more non-transitory computer-accessible storage media of claim 17, wherein the program instructions when executed on or across the one or more processors cause the request router to:
determine a querying pattern for the database that indicates when one or more queries of a particular one of the different query types are received by the database;
determine, based at least in part on the querying pattern, a future time when one or more expected queries of the particular query type will be received;
generate, based at least in part on the future time, a priming query of the particular query type to one or more of the database servers to prime one or more caches of the one or more database servers for the one or more expected queries; and
update the caching state metadata to reflect the priming of the caches.

* * * * *